United States Patent [19]

Hori

[11] Patent Number: 4,570,192

[45] Date of Patent: Feb. 11, 1986

[54] VIDEO RECORDING AND/OR REPRODUCING APPARATUS WITH EDIT CONTROL CIRCUIT

[75] Inventor: Takeshi Hori, Chigasaki, Japan

[73] Assignee: Sony Corporation, Tokyo, Japan

[21] Appl. No.: 445,466

[22] Filed: Nov. 30, 1982

[51] Int. Cl.$^4$ .................. G11B 27/02; H04N 5/78
[52] U.S. Cl. ................................ 360/14.2; 360/10.3
[58] Field of Search .................. 360/10.1, 10.3, 14.2, 360/70, 73

[56] References Cited

U.S. PATENT DOCUMENTS

| 3,647,951 | 3/1972 | Rose, Jr. ........................... 360/14.2 |
| 3,733,444 | 5/1973 | French, Jr. ....................... 360/14.2 X |
| 4,316,224 | 2/1982 | Hansen et al. .................... 360/14.2 X |
| 4,366,510 | 12/1982 | Watanabe et al. ................ 360/10.2 |

Primary Examiner—Aristotelis M. Psitos
Attorney, Agent, or Firm—Lewis H. Eslinger; Alvin Sinderbrand

[57] ABSTRACT

A control circuit for video tape recording and/or playback apparatus is coupled to a stationary control head for selectively changing the duty ratio of the control signal that accompanies the recorded video signal and is the same signal that is used to control the servo operation of head drum and capstan motors of the apparatus. Normally, the duty ratio of the control signal is 50%, but the control circuit permits an operator to selectively alter the duty ratio, for example, to 30%, to indicate that the accompanying segment of the recorded video signal is to be edited out, that is, skipped over when the tape is played back. A duty-ratio detector coupled to the control head discriminates the duty ratio of the reproduced control signal, and a system controller automatically changes the mode of the apparatus to advance at fast-forward past those portions of the video signal accompanied by a 30%-duty-ratio control signal.

5 Claims, 15 Drawing Figures

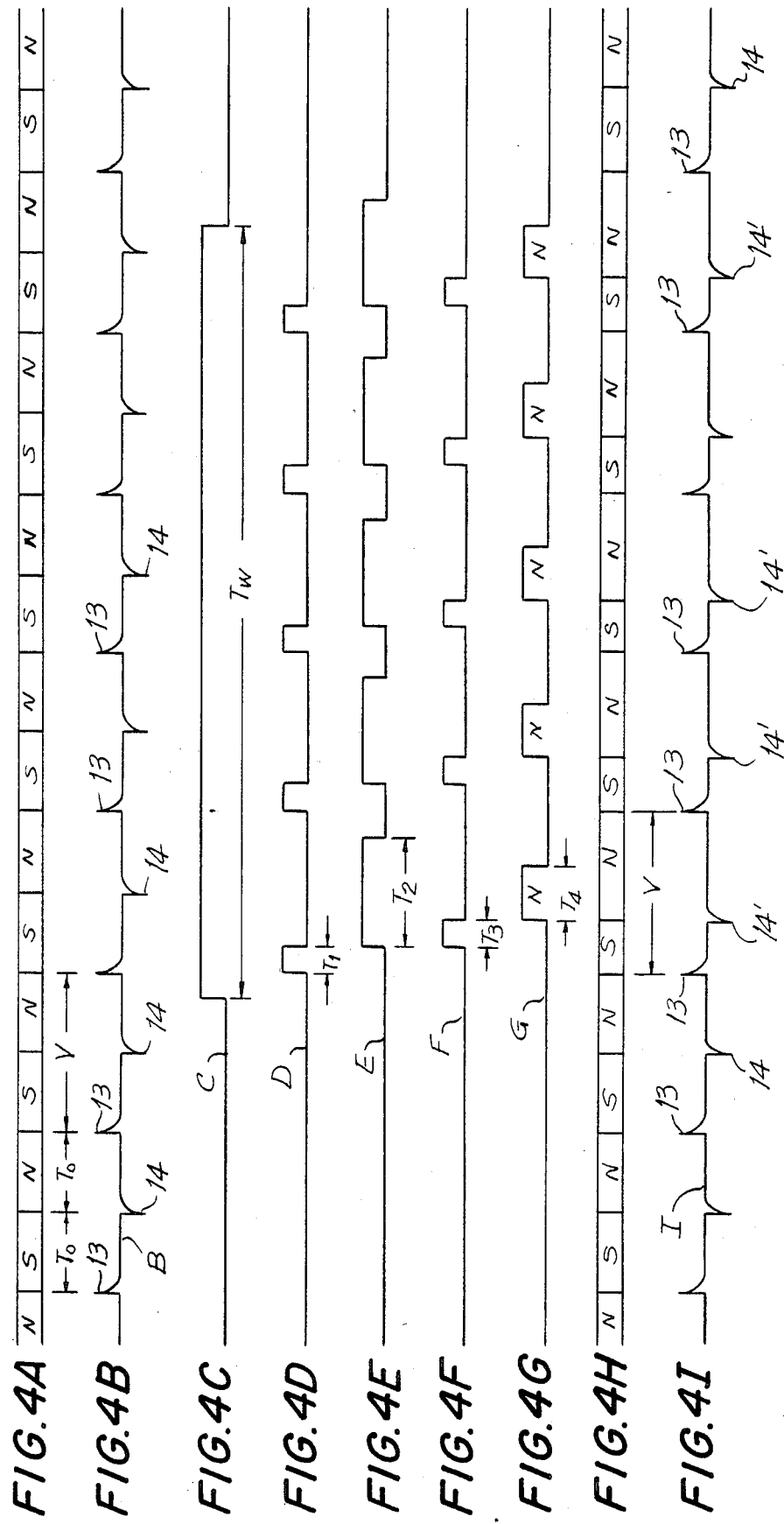

VIDEO RECORDING AND/OR REPRODUCING APPARATUS WITH EDIT CONTROL CIRCUIT

BACKGROUND OF THE INVENTION

This invention relates to video tape apparatus of the type in which a stationary control head detects control signals recorded in a longitudinal track on the tape. This invention is more particularly directed to an arrangement permitting so-called "single tape editing" in which the duty ratio of the control signals recorded on the control track is used for automatically controlling the tape transport speed of the video tape apparatus.

Whenever one or more video programs are recorded on a magnetic tape, various segments of the recorded program may be repetitive or otherwise unnecessary to the content of the overall video program on the tape. When the recorded video program is presented, it may be desirable to view certain of the recorded segments, and skip over the others, so that viewing time for the program is concentrated on the more interesting segments of the program.

In the so-called single-tape editing technique, an index or list is made of the recording time for the beginning and end of segments to be skipped over. Then, when the tape is played, an operator can fast-forward over the segments to be skipped, and play the remaining segments at normal speed.

One example of a possible application for the single-tape editing technique is in video-taped depositions of witnesses in preparation for a civil trial or other litigation. Many courts permit a previously video-taped deposition to be played back at the trial if, for example, a witness dies or becomes unavailable before trial. In such case, video-taped testimony that is not relevant, or testimony that is objected to, can be skipped over, with the remaining portions of the video taped testimony being played. In that case, it is desirable to use a single-tape-editing technique to reduce the amount of equipment required in editing the tape for presentation, and to reduce the cost of producing the edited tape.

Other examples of applications of such single-tape editing are in taped home video programs, and in broadcasts taped off the air, such as a sports event where it may be desirable to edit out the time out periods or other periods when there is no activity during the sports event.

However, conventional single-tape-editing techniques require that an index or list be made of precise times when the segments to be skipped over are reached. It is also necessary for a playback operator to manually set the video apparatus into a fast-forward mode when each segment to be skipped over is reached, and to set the apparatus back to a playback mode when the next segment of interest begins. Consequently, a considerable amount of error can occur in the playing of the tape. However, there has been no reliable single-tape-editing technique previously proposed for automatically playing back a prepared tape.

OBJECTS AND SUMMARY OF THE INVENTION

Accordingly, it is a desired object of this invention to provide a technique permitting so-called single-tape editing of a recorded video program, but which avoids the drawbacks of the prior art.

It is another object of this invention to provide a single-tape editing technique which permits video segments that are to be edited out to be automatically skipped over by setting the video tape apparatus into a fast-forward mode when such segments are reached, and automatically setting the apparatus back into a normal-speed playback mode when the following video segments of interest are reached.

It is still another object of this invention to provide a single-tape editing technique for carrying out automatic skip-over of video segments to be edited out by discrimination of the duty ratio of control signals that are also used to control servo motors for tape drum and capstan motors of the video tape apparatus.

In accordance with an aspect of this invention, a control circuit is provided for a helical scan video tape recording and/or reproducing apparatus for controlling the recording of magnetic control signals on a longitudinal control track of a video tape, with the video tape containing segments of video information recorded in video tracks thereon, and with the control track containing alternating regions of north and south magnetic polarity having a first predetermined duty ratio, for example, 50%. The control circuit is operative to change the duty ratio of the alternating north and south polarity regions to a second duty ratio, for example, 30% to indicate that the corresponding segments of the video information are to be edited out. This control circuit can comprise a stationary control head for recording the alternate regions of the control signal in the control track and for picking up the control signal therefrom as the tape is advanced past the control head. An edit signal generating circuit coupled to the control head is provided for changing the duty ratio of the control signal to the second duty ratio, and a selecting arrangement coupled to the edit signal generator selectively actuates the latter, for example, in response to depression of a push button by an operator, so that the selected segments of the video signal are accompanied by the control signal at the second duty ratio to identify such segments as video information to be edited out.

A duty-ratio detector coupled to the control head can discriminate whether the control signal accompanying the played-back video signal has the first duty ratio or the second duty ratio, and a control circuit, which can include a microprocessor, is responsive to the duty-ratio detector to control the tape advancing mechanism of the video tape apparatus for causing the tape to be advanced at normal speed when the control signal has the first duty ratio and to advance the tape at fast-forward speed when the control signal has the second duty ratio.

The foregoing and many other objects, features, and advantages of this invention will become more apparent from the ensuing detailed description of a preferred embodiment thereof, when considered in connection with the accompanying drawings.

BRIEF DESCRIPTION OF THE DRAWINGS

FIGS. 4A through 4I are waveform charts for explaining the operation of the embodiment of FIG. 2.

DETAILED DESCRIPTION OF A PREFERRED EMBODIMENT

Figure 1:
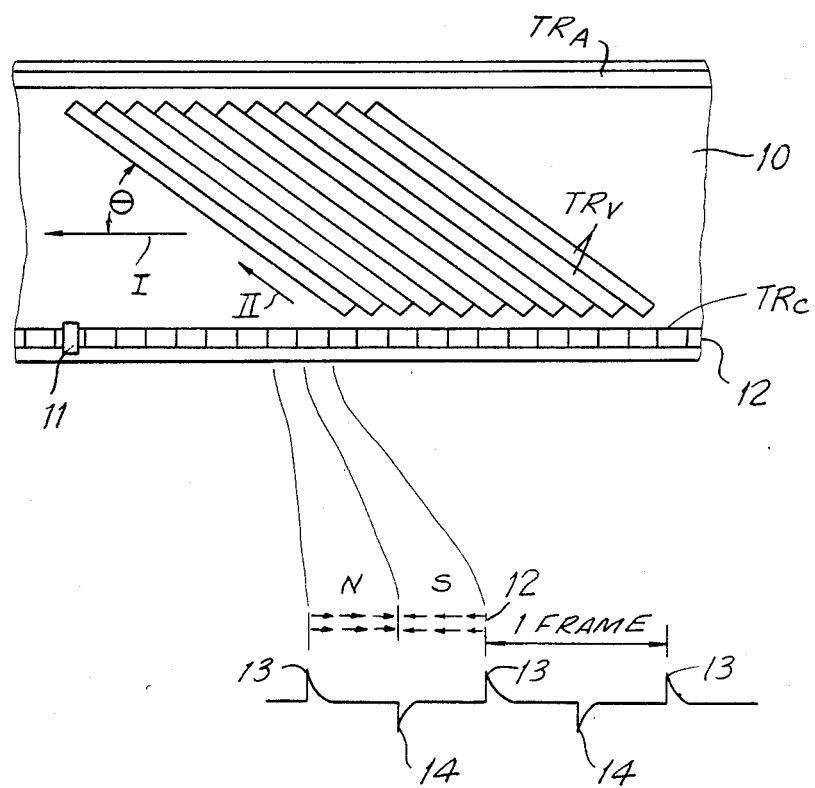
FIG. 1 is a plan view of a portion of a video tape having video signals and control signals recorded thereon.

With reference to the drawings, and initially to FIG. 1 thereof, a video tape 10 having a video signal recorded thereon is advanced in the direction shown by an arrow I. A longitudinal audio track $TR_A$ is recorded along one edge of the tape 10, and the video signal is recorded in slant tracks $TR_V$ disposed at an angle $\theta$ to the longitudinal direction of the tape 10. Here, the direction of head scan for the tracks $TR_V$ is upward and to the left in the drawing, as illustrated by an arrow II. A control track $TR_C$ is recorded along another edge of the tape 10 by means of a stationary control head 11. A control signal 12 is normally recorded in the control track $TR_C$ as a alternating pulse signal with a 50% duty cycle. The resulting recorded control signal 12 is a succession of regions of north and south polarity N, S, with the direction of polarity of the magnetic flux lines thereof indicated here by horizontal arrows. The positions of the transition from north to south and from south to north polarity mark the locations of particular recorded video tracks $TR_V$, with each such track $TR_V$ containing one field, that is, one-half frame of video information.

Upon playback of the video tape 10, the control head 11 picks up the control signal 12 to determine the location of the transitions between regions of north and south polarity. In this case, the output of the control head 11 is a differential signal having positive pulses 13, for example, at the transitions from south to north polarity of the control signal 12, and negative pulses 14 at the transition, for example, from north to south polarity. These control pulses 13 and 14 are normally used to control phase-locked loop circuits in capstan and head drum servo units of the associated video tape apparatus. In such apparatus, it is conventional to use only positive pulses 13, and to disregard the negative pulses 14. Because the distance between successive positive pulses 13 is one frame, i.e., two fields, the actual position of the pulses 14 is not important for servo control purposes. Accordingly, the duty ratio of the alternate north and south polarity regions N, S of the recorded control signal 12 can be altered without disturbing the operation of the capstan and head drum servo units. Hence, in the technique of this invention, the duty ratio of the north and south polarity regions of the control signal 12 is given a value different from 50% to indicate those portions of the corresponding video signal recorded in the tracks $TR_V$ which are to be either kept in or edited out.

Figure 2:
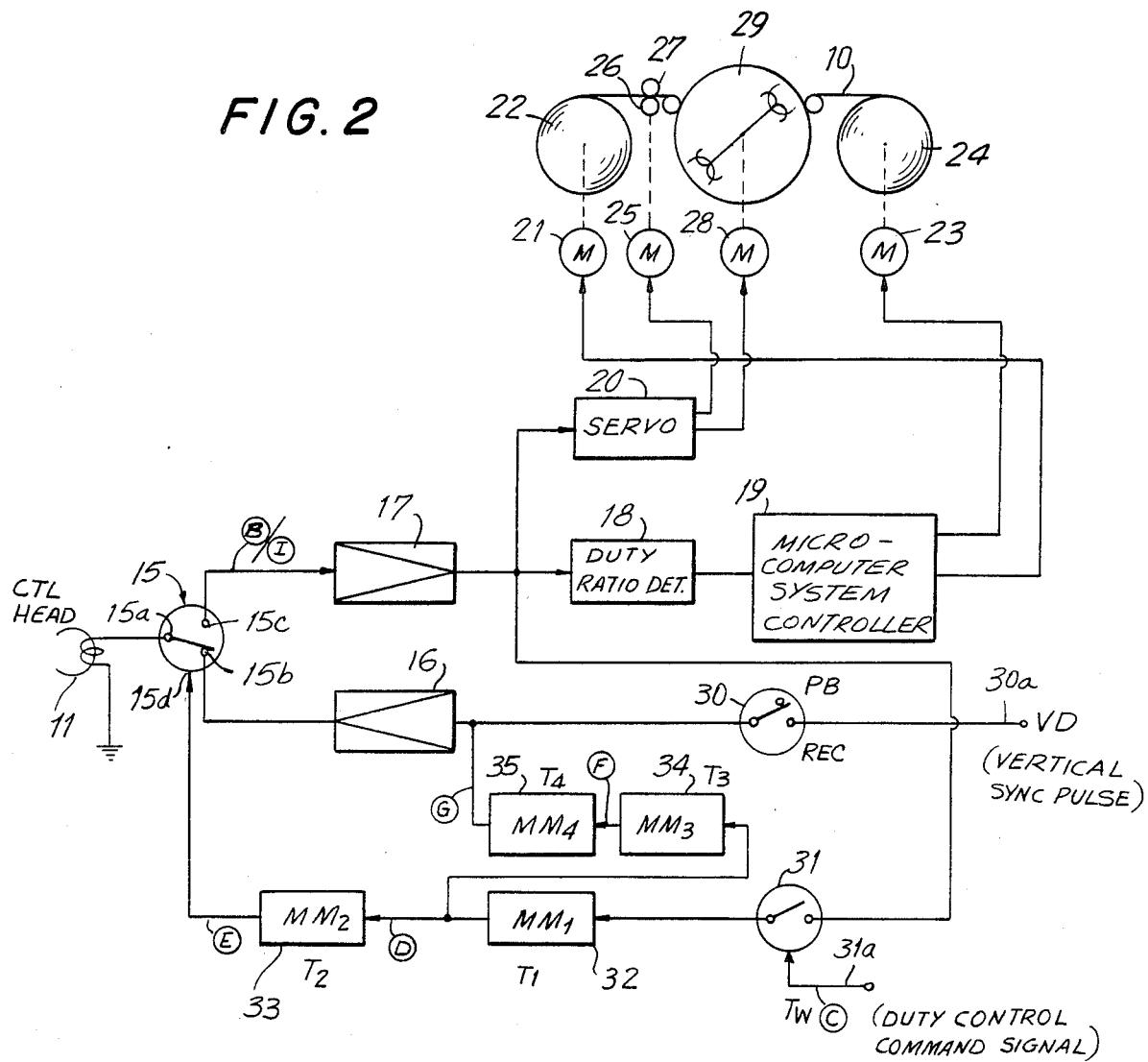
FIG. 2 is a schematic diagram of a control circuit for a video tape recording and/or reproducing device according to one embodiment of this invention.

A control circuit for carrying out the principles of this invention is shown in FIG. 2. In this control circuit edit signal means including, a control switch 15 is provided. The switch 15; has a fixed terminal 15a coupled to the control head 11, and also has first and second switched terminals 15b and 15c and a control terminal 15d.

The edit signal means also includes a control signal recording amplifier 16 that is connected to the first switched terminal 15b, while a control signal pick-up amplifier 17 is coupled to the second switched terminal 15c. A duty ratio detector 18 is connected to an output of the control signal pick up amplifier 17 and serves to discriminate the duty ratio of the control signal 12 picked up by the control head 11. This detector can be realized, for example, as a digital counter which counts up in response to the positive pulses 13 and counts down in response to the negative pulses 14.

A system controller 19, following the duty ratio detector 18, can favorably include a microcomputer, and serves to control the speed of advancement of the tape 10 in response to a discriminated duty ratio of the control signal 12 as determined by the duty ratio detector 18.

A servo circuit 20 has an input connected to the output of the control signal pick-up amplifier 17 and serves to carry out head drum and capstan servo functions.

A reel drive motor 21 is coupled to a supply reel 22 for the video tape 10, and another reel motor 23 is coupled to a take-up reel 24 for the tape 10. A capstan motor 25 drives a tape capstan 26, and a press roller 27 serves to press the tape 10 against the capstan 27 during at least normal-speed operation. A drum motor 28 drives a head drum 29, and the latter serves to record and pick up the video signals in the tracks $TR_V$.

The servo circuit 20 is coupled to the capstan motor 25 and the drum motor 28 to control the speed and synchronization of the capstan 26 and the head drum 29. The microcomputer system controller 19 is connected to the motors 21 and 23 to automatically set the apparatus into a fast-forward mode when a video segment to be edited is reached. Although not shown, the system controller 19 is also coupled to the press roller 27 to cause the latter to be released from the capstan during such fast-forward operation.

Although not specifically shown, the control head 11 is disposed along the run of the tape 10 between the reels 22 and 24.

A playback/record switch 30 has an input 30a coupled to receive a vertical synchronizing pulse VD during a recording operation, and has an output coupled to an input of the control signal recording amplifier 16.

Selecting means embodied in a selector or edit control switch 31 has an input coupled to the output of the control signal pick up amplifier 17 and has a control terminal 31a coupled to receive a duty control command signal, for example, in response to the depression of a push button (not shown) by an operator. Accordingly, the switch 31 closes in response to an occurrence of the duty control command signal.

The edit signal means further includes monostable multivibrators 32, 33, 34 and 35. The first monostable multivibrator 32, having a period $T_1$, has an input coupled to the switch 31, and a has an output coupled to inputs of second and third monostable multivibrators 33 and 34. The monostable multivibrator 33, which has a period $T_2$, has an output coupled to the control terminal 15d of the head control switch 15, while the third monostable multivibrator 34, which has a period $T_3$, has an output coupled to an input of a fourth monostable vibrator 35, which has a period $T_4$. The last-mentioned monostable multivibrator 35 has an output coupled to the input of the control signal record amplifier 16. A first timing circuit means includes the multivibrators 32, 34 and 35, and a second timing circuit means includes the multivibrator 33.

Figure 3A:
FIGS. 3A and 3B are waveform charts for explaining the single-tape editing technique of this invention.

Ordinarily, the control signal 12 has a duty ratio of substantially 50%, as shown in FIG. 3A. That is, the north and south polarity portions N, S of the recorded control signal 12 are of substantially equal length. A discrimination of this 50%-duty-ratio control signal by the duty ratio detector 18 will result in the microcomputer system controller 19 setting and maintaining the video tape apparatus in its normal, or forward mode.

Figure 3B:

Upon occurrence of the duty control command signal at the control terminal 31a of the edit control switch 31, the recorded control signal is modified, as shown in FIG. 3B (not drawn to scale), to have a duty ratio of substantially 30%, that is, the circuit elements 32–35, 15, and 16 of the circuit of FIG. 2 operate to cause the control head 11 to record the control signal 12 with a substantially longer north-polarized portions N than south-polarized portions S. In response to detection of the 30%-duty-ratio signal in duty ratio detector 18, the micro-computer system controller 19 causes the video tape apparatus to be set into a fast-forward mode until the next segment is reached in which the control signal 12 has a duty ratio of substantially 50%.

The operation of the control circuit of FIG. 2 can best be explained with reference to FIGS. 4A to 4I.

Initially, the video signal is recorded on the tape 10 as plurality of successive video segments corresponding, for example, to different scenes. At that time, the accompanying control signal 12 is also recorded with a duty ratio of 50%, as shown in FIG. 4A. Here, the length of each south-polarized portion S of the control signal 12 corresponds to one field period $T_0$ as does the length of each north-polarized portion N. The distance between two successive transitions of the same polarity thus corresponds to a frame period V.

Accordingly, when an operator plays back a tape to be edited, the control head 11 provides the pulse signals 13 and 14, shown as signal B in FIG. 4B, to the input of the amplifier 17.

When an operator decides that a segment of the video program is to be edited (i.e., skipped over), he or she can depress an edit button and hold the same down for the duration of such segment to be edited, and the duty control command signal is applied, as a signal C shown in FIG. 4C and having a width $T_W$, to the control terminal 31a of the edit control switch 31 to close the latter.

During the time that the switch 31 is closed, the positive control pulses 13 are applied to the first monostable multivibrator 32, which provides pulses D, as shown in FIG. 4D, of width $T_1$ commencing with the occurrences of the pulses 13. The trailing edges of the pulses D trigger the monostable multivibrator 33 which in turn provides pulses E, as shown in FIG. 4E, of width $T_2$ to switch over the control head switch 15 from the terminal 15c to the terminal 15b. In this embodiment, the sum of the pulse periods $T_1$ and $T_2$ is greater than one field period $T_0$, but less than one frame period V.

The trailing edge of the pulses D also serves to trigger the monostable multivibrator 34, which produces pulses F, as shown in FIG. 4F, with a period $T_3$. Here, the sum of the periods $T_1$ and $T_3$ together constitute about 30% of one video frame period V.

The trailing edge of the pulses F then serve to trigger the monostable multivibrator 35, which produces pulses G, as shown in FIG. 4G, which have a pulse period $T_4$. These pulses G are applied though the amplifier 16 and the switch 15 to the control head 11 so that the latter extends the north-polarized recorded portions N of the control signal 12, as shown in FIG. 4H.

That is, whereas the recorded control signal 12 had an initial duty ratio of 50%, the duty ratio thereof is changed to 30% to identify segments of the video program to be edited out or skipped over. Then, when the next segment of video information of interest is reached, the operator can release the editing button so that the switch 31 opens. At that point, the associated control signal 12 remains with its normal 50% duty ratio.

As shown in FIG. 4I, when the tape having the duty-ratio-modified control signal 12 as shown in FIG. 4H is played back, the control head 11 produces a control pulse signal I having positive pulses 13 and negative pulses 14', as shown in FIG. 4I. This pulse signal I is furnished through the amplifier 17 to both the servo circuit 20 and the duty ratio detector 18. In this pulse signal I, the distance between the successive positive pulses 13 remains unchanged as one frame interval V. However, the distance between each positive pulse 13 and the next successive negative pulse 14' is only 30% of the frame interval V. Consequently, even though the pulse signal I can be used in the servo circuit 20 for accurate servo control of the motors 25 and 28, the duty ratio can be readily discriminated in the duty ratio detector 18 to cause the video tape apparatus to skip over those segments, and only those segments, of the video signal which are accompanyied by the 30%-duty-ratio control signal 12.

Figure 5:
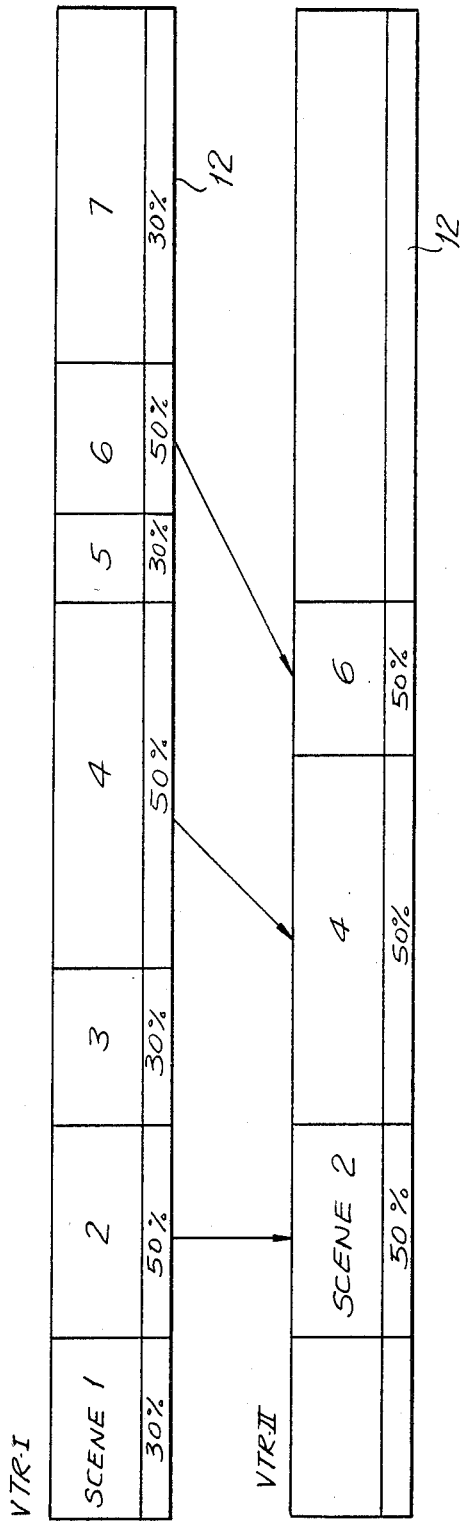
FIG. 5 is a diagram for explaining a two-tape editing technique employing the principles of this invention.

FIG. 5 illustrates generally a two-tape technique employing the principles of this invention for generating an edited tape using a second video tape recorder. According to this technique, a first video tape is prepared as described above in which scenes 1, 3, 5, and 7 to be edited out are accompanied by a control signal 12 having a modified duty ratio of 30%, while the remaining scenes 2, 4, 6, etc. are accompanied by control signals having a duty ratio of 50%. Thereafter, by discriminating the duty ratio of the accompanying control signal 12, a second video tape recorder records only scenes 2, 4, 6, etc. on a second video tape.

Figure 6:
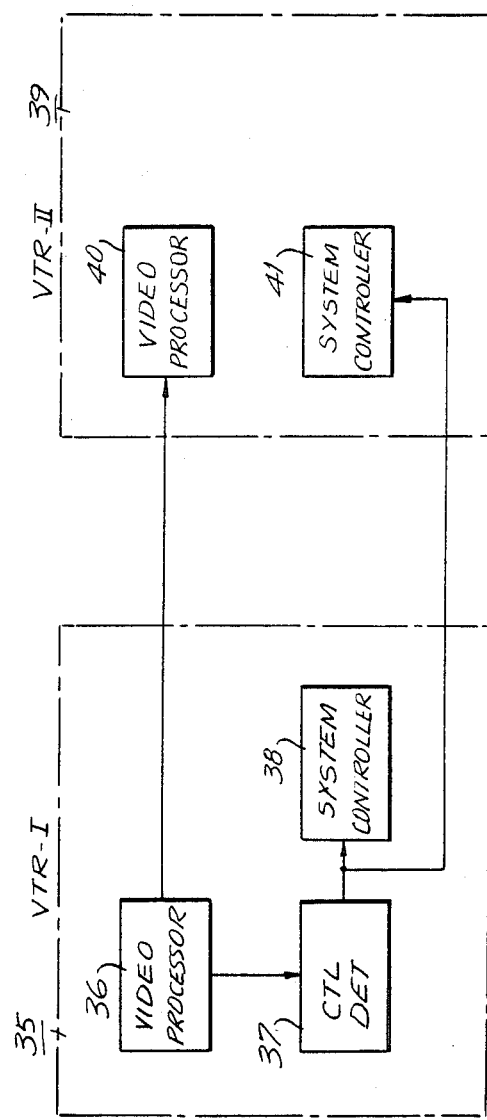
FIG. 6 is a schematic block diagram of an arrangement for carrying out the two-tape editing technique of FIG. 5.

An arrangement for carrying out this two-tape editing technique is shown in FIG. 6. A first video tape recorder 35 includes a video processor 36, here representing those elements necessary to play back the video signal from the tape. A control signal detector 37 includes an element corresponding to the duty-ratio detector 18 of FIG. 2, while a system controller 38 coupled to the control signal detector 37 corresponds to the system controller 19 of FIG. 2. A second video tape recorder 39 includes a video processor 40 coupled to the video processor 36 of the first video tape recorder 35, and a system controller 41 coupled to the control signal detector 37 of the first video tape recorder 35.

While the above embodiment of this invention utilizes a technique for changing the duty ratio of the control signal 12 from 50% to 30%, an equivalent technique could be used in which the duty ratio is increased, for example, from 50% to 70%. Moreover, while the technique of this invention uses the duty-ratio-modified control signal 12 to identify those portions of the video signal to be edited out, the duty-ratio-changed segments of the control signal 12 could instead be used to identify those segments of interest of the video signal to be kept, with the remaining portions, identified with the 50%-duty-ratio control signal, to be edited out.

In addition, while a single preferred embodiment of this invention has been illustrated and described hereinabove, many possible modifications and variations thereof will become apparent to those persons skilled in the art without departure from the scope and spirit of this invention, as defined in the appended claims.

What is claimed is:

1. A control circuit to control recording of magnetic signals on a longitudinal control track of a video tape, wherein said video tape contains segments of video information recorded in video tracks thereon and said control track contains alternating regions of first and second polarities having a first duty ratio, said regions of first and second polarities being adapted to generate control pulses supplied as inputs to phase-locked loop circuits for controlling playback of said video information; said control circuit comprising:
   a stationary control head for recording said alternate regions of said control signal in said control track;
   edit signal means coupled to said control head for changing the duty ratio of said control signal to a second duty ratio; and
   selecting means coupled to said edit signal means for selectively actuating the latter so that selected segments of said video signal are accompanied by said control signal at said second duty ratio to identify such segments as video information to be edited;
   said edit signal means including switching means having a fixed terminal coupled to said control head, first and second switched terminals and a control input, means coupled to the first switched terminal of said switching means to generate control pulses in response to movement of said control track past said control head, first timing circuit means for supplying to the second switched terminal of said switching means a DC signal for a predetermined duration following occurrences of said control pulses during actuation of said selecting means, and second timing circuit means for supplying to the control input of said switching means a switching signal of a predetermined duration in response to occurrences of said control pulses during actuation of said selecting means.

2. A control circuit according to claim 1, wherein said selecting means includes selector switch means for passing said control pulses upon actuation of said switch means; said first timing circuit means includes a first monostable multivibrator having an input coupled to said selecting means and an output providing an output signal of a first duration having a trailing edge, and monostable circuit means responsive to said trailing edge for providing said DC signal commencing a predetermined time following said trailing edge; and said second timing circuit means includes a second monostable multivibrator having an input coupled to the output of said first monostable multivibrator and generating as said switching signal a DC pulse signal commencing at said trailing edge.

3. A control circuit according to claim 2, wherein said monostable circuit means of said first timing circuit means includes a third monostable multivibrator having an input coupled to the output of the first monostable multivibrator and an output providing an output pulse signal of a second duration commencing with the trailing edge of the output signal of the first monostable multivibrator and having a trailing edge; and a fourth monostable multivibrator having an input coupled to the output of said third monostable multivibrator and an output coupled to said second switched terminal of said switching means for generating as said DC signal a pulse signal having said predetermined duration commencing with the trailing edge of the output pulse signal from said third monostable multivibrator.

4. A control circuit according to claim 3; wherein said first duty ratio is substantially 50%; wherein under normal speed advancement of said video tape the control pulses of a predetermined polarity occur at a preestablished period; and wherein the sum of said first duration and said second duration is less than 50% of said preestablished period and determines said second duty ratio.

5. A control circuit according to claim 4, wherein said sum is substantially 30% of said preestablished period, whereby said second duty ratio is substantially 30%.

* * * * *